June 9, 1936.  G. MAIURI  2,043,548
ABSORPTION REFRIGERATING MACHINE
Filed Nov. 11, 1935
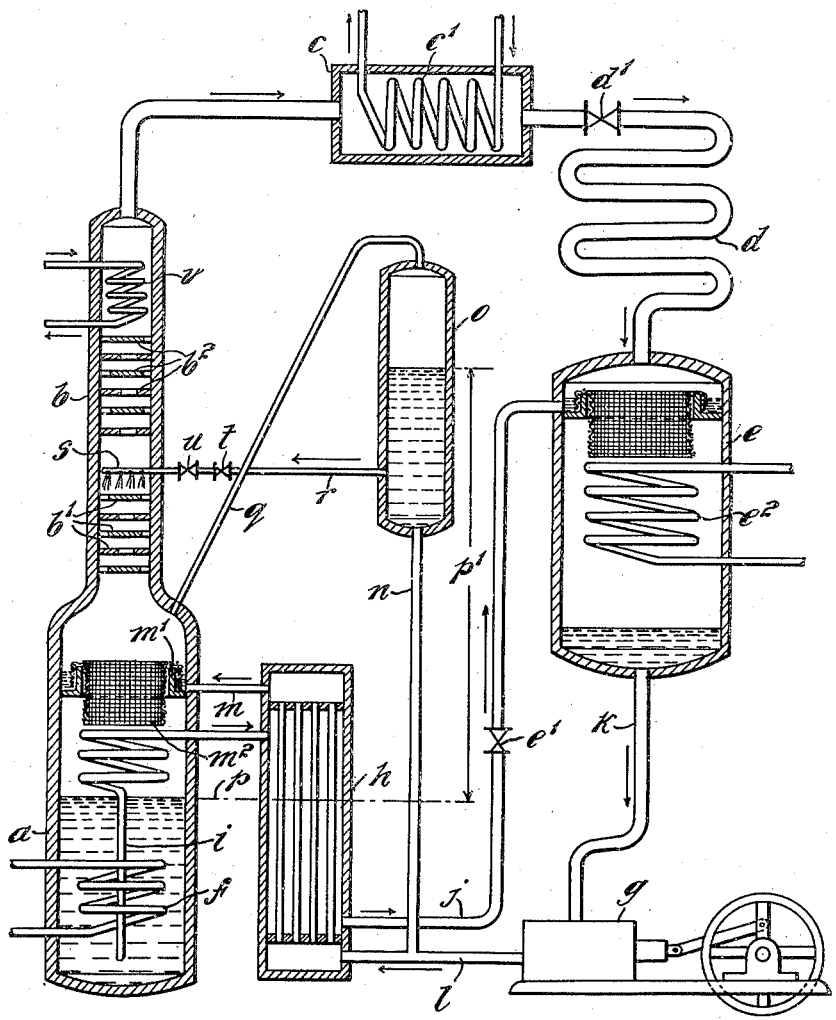
Inventor
Guido Maiuri
BY: Francis E. Boyce
ATTORNEY Patented June 9, 1936

2,043,548

UNITED STATES PATENT OFFICE 2,043,548

ABSORPTION REFRIGERATING MACHINE

Guido Maiuri, Aldwych, London, England, assignor to Maiuri Refrigeration Patents Limited, London, England Application November 11, 1935, Serial No. 49,133
In Great Britain October 30, 1935

4 Claims. (Cl. 62—119)

This invention relates to absorption refrigerating machines having liquid absorption media, and its object is to provide improved means for effecting rectification of the refrigerant vapour driven-off from the liquor in the boilers of these machines.

In absorption refrigerating machines having liquid absorption media, for instance as is most usual aqua-ammonia, the vapour which is driven-off in the boiler of the machine consists of a mixture of the vapour of the absorption medium, for instance water vapour, and of the vapour of the absorbed refrigerant, for instance ammonia vapour. The proportions of these vapours depend on the strength of the absorption liquor and the boiling temperature and pressure.

Hitherto the vapour of the refrigerant has been rectified from the vapour of the absorbent by condensing the latter by means of cooled surfaces, provided for instance by a water-cooled coil, from which the condensed absorbent flows back into the boiler.

Rectification by condensation on cooling surfaces entails a loss of heat energy by the withdrawal of heat by the cooling surface, which loss, for efficiency, it is desirable to avoid. Moreover, the condensation which is effected in the rectifier is not confined to condensation of vapour of the absorption medium but involves also condensation of vapour of the refrigerant, which has to be re-vaporized in the boiler. For example, with aqua-ammonia having a concentration of 36% boiling under a pressure of 10 kg/cm² absolute, the vapour which is evolved is composed of 5% water and 95% ammonia. Condensation of water vapour in the presence of ammonia vapour, at 40° C. and 10 kg/cm², produces a liquor of 70% ammonia strength. Hence in condensing 5 parts of water, $$5 \times \frac{70}{30} = 11.67$$

parts of ammonia are condensed therewith. This involves a loss of heat energy not recognized when merely the condensation of the water vapour is considered. With a very weak liquor, the condensation of ammonia accompanying the condensation of the water in rectification, can reach such limits that no ammonia vapour is left to pass out of the boiler, or inversely considered, a limit is placed upon the weakness of the liquor from which ammonia can be usefully driven-off in the boiler, although for attaining low refrigerating temperatures in the evaporator, only a weak liquor can be present in the absorber and be supplied therefrom to the boiler.

The present invention enables rectification to be effected in absorption refrigerating machines without or with only slight loss of heat on cooling the vapour from the boiling liquor, to effect rectification.

It is usual in absorption refrigerating machines to conserve the heat of the weak liquor passing from the boiler to the absorber by leading it in heat-exchange contra-flow with, and so as to heat, the rich absorption liquor passing from the absorber to the boiler.

Now according to the present invention some of the rich liquor from the absorber is diverted from heat-exchange with the weak liquor from the boiler, and instead is introduced at a temperature approximately that of the absorber into the vapour ascending in the rectifier from the boiler. The relatively cool rich liquor thus introduced into the rectifier condenses the ascending water vapour and some of the ascending refrigerant vapour, without loss of heat, as the latent heat of the vapour condensed is utilized within the boiler to heat the rich liquor and to boil out therefrom an equivalent weight of the refrigerant.

Both by weight and volume the amount of rich liquor which passes from the absorber to the boiler exceeds the amount of weak liquor which passes from the boiler to the absorber, the excess being equal to the amount of vaporized refrigerant which has been driven-off from the, now weak, liquor. In consequence, if the excess of strong liquor is diverted to the rectifier, the heat-exchange with the weak liquor will be more suitably effected, because with equal quantities of weak and strong liquor, the temperature differences between them at both ends of the heat-exchanger become equalized. Moreover, as for efficiency it is more desirable that the temperature of the rich liquor shall be raised as near as possible to that of the liquor in the boiler, than that the temperature of the weak liquor shall be lowered to that of the liquor in the absorber, the amount of rich liquor diverted to the rectifier from heat-exchange with the weak liquor, may exceed the excess of rich liquor over weak liquor.

The strong liquor diverted from passing through the heat-exchanger, on entering the rectifier and flowing down therefrom into the boiler, cools the vapour mixture and condenses therefrom both the water and some of the ammonia, in the case of aqua-ammonia. The liquor on its descent into the boiler progressively increases in richness by condensation of ammonia vapour, and in bulk by the condensation of both ammonia vapour and water vapour, and in temperature until it boils, when being very rich almost entirely only ammonia vapour is driven off.

With a correctly proportioned supply of diverted rich liquor, the water vapour can be practically entirely re-condensed and the ammonia condensed therewith can be entirely re-evaporated at the expense of extraction of heat from the vapour mixture coming from the boiler and being cooled before passing on to the condenser.

The above described arrangement can advantageously be adopted in a boiler wherein, in the known manner, rectification is effected so that the vapour is in equilibrium with relatively rich liquor. Such a boiler for instance has baffle plates, small bodies, or perforated partitions or similar devices whereon the condensed liquor becomes progressively richer by absorption of ascending refrigerant vapour. In such a boiler the liquor increasing in richness flowing down from the rectifier increases the strength of the liquor at the top of the boiler, and thereby reduces the quantity of water vapour formed. This action is assisted by the introduction of the un-heated rich liquor into the rectifier as such rich liquor in its descent into the boiler becomes richer than the remainder of the rich liquor introduced directly into a boiler. For example, with liquor having a concentration of 16% the water vapour generated would be 30% of the mixed vapour generated. With one ninth of the rich liquor diverted to the rectifier, such diverted liquor would absorb refrigerant and reach the boiler with a concentration of 60% or more. Mixing with the rich liquor entering the boiler, the result is equivalent to a liquor entering the boiler with a concentration of about 20.4%, from which mixture the water vapour would be reduced to 15%.

A continuous absorption refrigerating machine embodying the invention is diagrammatically illustrated in sectional elevation on the accompanying drawing, in which:—

$a$ is the boiler, $b$ the rectifier, $c$ the condenser, $d$ the evaporator and $e$ the absorber.

Rich aqua-ammonia in the boiler $a$, is heated by a steam coil $f$, to boil and the evolved vapour passes upwards into the rectifier $b$, wherein practically the whole of the water vapour is re-condensed and returned to the boiler $a$, as will be hereinafter described. Ammonia vapour passes from the rectifier $b$ into the condenser $c$, cooled by a coil $c^1$ traversed by cooling water, whereby the ammonia is liquefied. From the condenser $c$ the liquefied ammonia passes past a regulating valve $d^1$ into the evaporator $d$, wherein it evaporates under the reduction of pressure caused by the absorption of ammonia vapour in the absorber $e$, which latter is in free communication with the evaporator $d$. Weak liquor from the lower portion of the boiler $a$ is supplied to the top of the absorber $e$ past a regulating valve $e^1$, and rich liquor is withdrawn from the bottom of the absorber $e$ by a pump $g$ and delivered into the upper portion of the boiler $a$. The absorber is cooled by a coil $e^2$ traversed by cooling water.

So far the description is that of any typical continuous absorption refrigerating machine of the kind wherein the difference in pressure between the boiler and condenser and the evaporator and absorber is adjusted by regulating valves and overcome by a rich liquor pump.

As usual, a heat-exchanger $h$ is provided wherein the weak liquor delivered from the boiler $a$, by the pressure therein, to the absorber $e$ passes in contra-flow to rich liquor delivered by the pump $g$ to the boiler $a$.

The hot weak liquor is expelled by the boiler pressure through a pipe $i$ extending from the bottom of the boiler $a$ and connected to the heat-exchanger $h$. From the heat-exchanger $h$ the boiler pressure forces the weak liquor through a pipe $j$, included in the length of which is the above-mentioned regulating valve $e^1$, into the top of the absorber $e$.

The bottom of the absorber $e$ is connected to the pump $g$ by a pipe $k$ through which rich liquor is withdrawn from the absorber $e$ by the pump $g$.

The pump $g$ delivers the rich liquor through a pipe $l$ connected to the heat-exchanger $h$, from which latter rich liquor is delivered into the upper portion of the boiler $a$ through a pipe $m$ terminating within the boiler $a$ in an annular trough $m^1$, from which the rich liquor overflows by a wick $m^2$.

As usual, the cold rich liquor becomes heated in flowing through the heat-exchanger $h$, by the hot weak liquor flowing in contra-flow through the heat-exchanger from the boiler $a$. To ensure efficient heat-exchange in the heat-exchanger $h$ with a limited area of heat-exchanging surface thereof, the section of the passages of flow therethrough is narrow and the velocity of flow is in consequence high. This, by frictional resistance, causes a drop in pressure of the rich liquor (and incidentally also of the weak liquor) in flowing through the heat-exchanger $h$, so that the pressure at which the pump $g$ delivers the rich liquor must be correspondingly higher than the boiler pressure.

A pipe $n$ terminating in a closed chamber $o$ extends upwards from the delivery pipe $l$ of the pump $g$ to some distance above the liquor level $p$ in the boiler $a$. A pipe $q$ of small bore interconnects the vapour space of the boiler $a$ and the top of the chamber $o$, so that the top of the chamber $o$ is directly subjected to the boiler pressure.

Owing to the resistance to flow in the heat-exchanger $h$, the delivery pressure of the pump $g$ has to exceed the boiler pressure. Such excess of pressure causes rich liquor to ascend the pipe $n$ into the chamber $o$ to a height at which the excess of the delivery pressure of the pump over the boiler pressure, is balanced by the static head $p^1$ of the column of rich liquor, in the pipe $n$ and chamber $o$, above the level $p$. The liquor level in the chamber $o$ obviously will rise and fall slightly at every stroke of the pump $g$.

A pipe $r$ of small bore extends, horizontally or slightly downwardly inclined, from the chamber $o$ beneath the level of the rich liquor therein, to an annular rose $s$ within the rectifier $b$, so that rich liquor flows from the chamber $o$ into the rectifier. This cold rich liquor, issuing from the rose $s$ as a rain, falls on to and drips from the usual rectifier baffle plates $b^1$ and encounters the ascending mixed vapour of ammonia and water rising from the boiler and condenses some of the ammonia but in most cases condenses practically the whole of the water vapour, as already explained.

The proportion of cold rich liquor flowing through the pipe $r$ directly to the rectifier $b$, relatively to the rich liquor flowing into the boiler $a$ through the heat-exchanger $h$, is approximately determined by suitable selection of the resistance to flow presented by the dimensions of the pipe r, and can be adjusted by a regulating valve t in the pipe r.

The resistance to flow in the pipe r can be created by an abrupt constriction in the flow passage followed by an abrupt re-enlargement, often termed a standard orifice of flow.

A non-return valve u is also provided in the pipe s.

Instead of the pump g being directly connected to the heat-exchanger h, it may deliver the rich liquor only to the elevated vessel o, in which case the rich liquor is distributed from the vessel o proportionally by appropriate resistances to flow, both to the rectifier b and to the heat-exchanger h.

By arranging the upwardly extending pipe n and chamber o without any downward inclination such as would trap gases, these also serve to vent to the boiler a any gases or vapours delivered by the pump g together with the rich liquor.

If the amount of cold rich liquor diverted from the heat-exchanger and introduced directly into the rectifier is insufficient to effect complete rectification, the vapours may be additionally cooled by a cooling coil v arranged in the top of the rectifier, above baffle plates b², and traversed by cooling water. Such a condition may arise when very low temperatures are attained in the evaporator and only warm cooling water is available for cooling the absorber, for in such case the rich liquor is only relatively rich and is in fact low in ammonia content and the proportion of water vapour to be condensed is therefore large. It should be clearly understood that cooling by the rectifier cooling coil v is ordinarily not required, and of course lessens the efficiency, as the heat abstracted thereby has to be made up by increased heating of the boiler a.

In the case of a multi-stage absorption refrigerating machine, the rectifier of each stage may be supplied directly with rich liquor from the pump of the respective stage.

I claim:—

1. In a continuous absorption refrigerating machine, a boiler, a rectifier connected to said boiler, a condenser connected to said rectifier, an evaporator connected to said condenser, an absorber connected to said evaporator, a rich liquor pump connected to said absorber, means for supplying rich liquor from the delivery of said pump to said boiler, means for supplying, in heat-exchange proximity with said rich liquor, weak liquor from said boiler to said absorber, a closed chamber directly connected to the delivery of said pump and extending above the liquor level in said boiler, means venting said chamber to said boiler, and means for introducing rich liquor from said chamber into said rectifier.

2. In a continuous absorption refrigerating machine, a boiler, a rectifier connected to said boiler, an extraneously cooled cooler in said rectifier, a condenser connected to said rectifier, an evaporator connected to said condenser, an absorber connected to said evaporator, means for supplying rich liquor from said absorber to said boiler, means for supplying, in heat-exchange proximity with said rich liquor, weak liquor from said boiler to said absorber, and means for introducing, below said cooler and approximately at the temperature of said absorber, rich liquor from said absorber into said rectifier.

3. In a continuous absorption refrigerating machine, a boiler, a rectifier connected to said boiler, an extraneously cooled cooler in said rectifier, a condenser connected to said rectifier, an evaporator connected to said condenser, an absorber connected to said evaporator, a rich liquor pump connected to said absorber, means for supplying rich liquor from the delivery of said pump to said boiler, means for supplying, in heat-exchange proximity with said rich liquor, weak liquor from said boiler to said absorber, and means for introducing, below said cooler and approximately at the temperature of said absorber, rich liquor from the delivery of said pump into said rectifier.

4. In a continuous absorption refrigerating machine, a boiler, a rectifier connected to said boiler, an extraneously cooled cooler in said rectifier, a condenser connected to said rectifier, an evaporator connected to said condenser, an absorber connected to said evaporator, a rich liquor pump connected to said absorber, means for supplying rich liquor from the delivery of said pump to said boiler, means for supplying, in heat-exchange proximity with said rich liquor, weak liquor from said boiler to said absorber, a closed chamber directly connected to the delivery of said pump and extending above the liquor level in said boiler, means venting said chamber to said boiler, and means for introducing, below said cooler, rich liquor from said chamber into said rectifier.

GUIDO MAIURI.